US006185512B1

(12) United States Patent
Lambrecht

(10) Patent No.: US 6,185,512 B1
(45) Date of Patent: Feb. 6, 2001

(54) METHOD AND SYSTEM FOR ENHANCING THE ACCURACY OF MEASUREMENTS OF A PHYSICAL QUANTITY

(75) Inventor: Mark A. Lambrecht, Dallas, TX (US)

(73) Assignee: Raytheon Company, Lexington, MA (US)

(*) Notice: Under 35 U.S.C. 154(b), the term of this patent shall be extended for 0 days.

(21) Appl. No.: 09/170,849

(22) Filed: Oct. 13, 1998

(51) Int. Cl.[7] .............................. G06F 17/60; G01V 5/00
(52) U.S. Cl. .......................... 702/97; 702/159; 702/165; 702/189; 702/14; 342/25
(58) Field of Search .................................. 702/11.18, 97, 702/159, 165, 189, 191, 196, 109; 367/38, 59; 342/25, 179; 606/372

(56) References Cited

U.S. PATENT DOCUMENTS

| 4,562,540 | 12/1985 | Devaney | 364/400 |
|---|---|---|---|
| 4,995,011 | 2/1991 | Spiesberger | 367/127 |
| 5,247,436 | 9/1993 | Stone, Jr. | 364/413 |
| 5,318,475 | 6/1994 | Schrock et al. | 460/1 |
| 5,321,613 | 6/1994 | Porter et al. | 364/420 |
| 5,729,451 | 3/1998 | Gibbs et al. | 364/421 |
| 5,838,634 | 11/1998 | Jones et al. | 367/73 |
| 5,884,229 | 3/1999 | Matteucci | 702/14 |
| 5,978,646 | 11/1999 | Weinberg | 434/6 |
| 5,983,067 | 11/1999 | Weinberg | 434/6 |
| 5,995,882 * | 11/1999 | Patterson et al. | 701/21 |
| 6,002,914 | 12/1999 | Weinberg | 434/6 |

OTHER PUBLICATIONS

Lawrence, M.W.; "Acoustic deep bottom experiment", Bulletin of the Australian Acoustical Society, vol. 12, No. 2, p. 57; Aug. 1984.*

Penny Dunn, Eugene Molinelli, Mark Lambrecht, "Data Fusion for a Model of Seafloor Depths," The HYSAS Program of NIMA, paper presented at The Oceanology International '97 Asian–Pacific Rim Conference in Singapore, May 1997, ©1997 Raytheon Systems Company, Inc., 15 pps.

"Remote Sensing for Marine and Coastal Environments," Proceedings of the Fourth International Conference, Technology and Applications, HYSAS Overview, presented at the Fourth International Conference on Remote Sensing for Marine and Costal Environments, Orlando, Florida, Mar. 17–19, 1997, ©1997 Raytheon Systems Company, Inc., 11 pps.

David L. B. Jupp, Alan H. Strahler, Member, IEEE, and Curtis E. Woodcock, "Autocorrelation and Regularization in Digital Images, I. Basic Theory", IEEE Transactions on Geoscience and Remote Sensing, vol. 26, No. 4, Jul. 1988, pps. 463–473.

(List continued on next page.)

*Primary Examiner*—Kamini Shah
(74) *Attorney, Agent, or Firm*—Baker Botts L.L.P.

(57) ABSTRACT

A method for determining measurements of a surface includes determining a trend for a plurality of measurements and determining, for each of at least one of the plurality of measurements, an associated residual between the trend and the measurement and determining, for each of at least one of the associated residuals, an interpolated value for the residual. The method also includes comparing, for each of the at least one associated residuals, the residual to the interpolated value of the residual to determine whether a measurement associated with the residual is anomalous. In response to determining that a measurement associated with the residual is anomalous, the anomalous measurement is discarded. The remaining measurements then represent the surface of interest. The system includes a processor for executing a program of the method. Further, the system includes memory, an input device, and an output device.

16 Claims, 4 Drawing Sheets

OTHER PUBLICATIONS

David L. B. Jupp, Alan H. Strahler, Member, IEEE, and Curtis E. Woodcock, "Autocorrelation and Regularization in Digital Images, II. Simple Image Models", IEEE Transactions on Geoscience and Remote Sensing, vol. 27, No. 3, May 1989, pps. 247–258.

Paul J. Curran and Jennifer L. Dungan, "Estimation of Signal–to–Noise: A New Procedure Applied to AVIRIS Data", IEEE Transactions on Geoscience and Remote Sensing, vol. 27, No. 5, Sep. 1989, pps. 620–628.

Peter M. Atkinson and Paul J. Curran, "Defining an Optimal Size of Support for Remote Sensing Investigations", IEEE Transactions on Geoscience and Remote Sensing, vol. 33, No. 3, May 1995, pps. 768–776.

Didier Jourdan, Centre Militaire d'Océanographie, Efstathios Balopoulos, National Center for Marine Research, HNODC, Maria–Jesus Garcia–Fernandez, Instituto Español de Oceanografia, Catherine Maillard, IFREMER/SISMER, "Objective Analysis of Temperature and Salinity Historical Data Set over the Mediterranean Basin", pps. 82–87, 1998.

D. Rees and J–P. Muller, Department of Photogrammetry and Surveying, University College London, "Surface Roughness Estimation Using Fractal Variogram Analysis", pps. 1951–1954, no date.

Gregory J. White, Naval Systems Engineering Department, U.S. Naval Academy, USA, and Bilal M. Ayyub, Department of Civil Engineering, University of Maryland, "Semivariogram and Kriging Analysis in Developing Sampling Strategies", 1990 IEEE, pps. 360–365.

I–I Lin and W. G. Rees, Scott Polar Research Institute, University of Cambridge, "Spatial Texture in AirSAR Images of the Greenland Ice Sheet", 1994 IEEE, pps. 2385–2387.

A. T. C. Chang, Hydrological Sciences Branch, Goddard Space Flight Center and L. S. Chiu, Applied Research Corporation, Decorrelation Distance of Snow in the Colorado River Basin, pps. 1247–1250, no date.

* cited by examiner

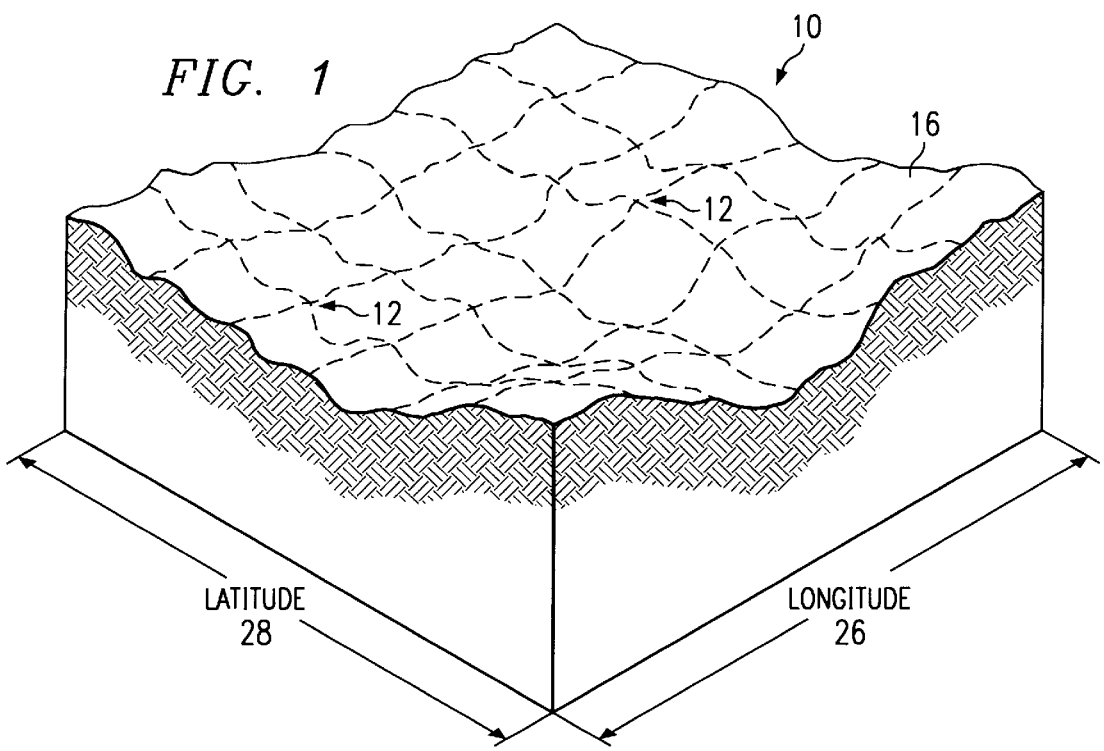
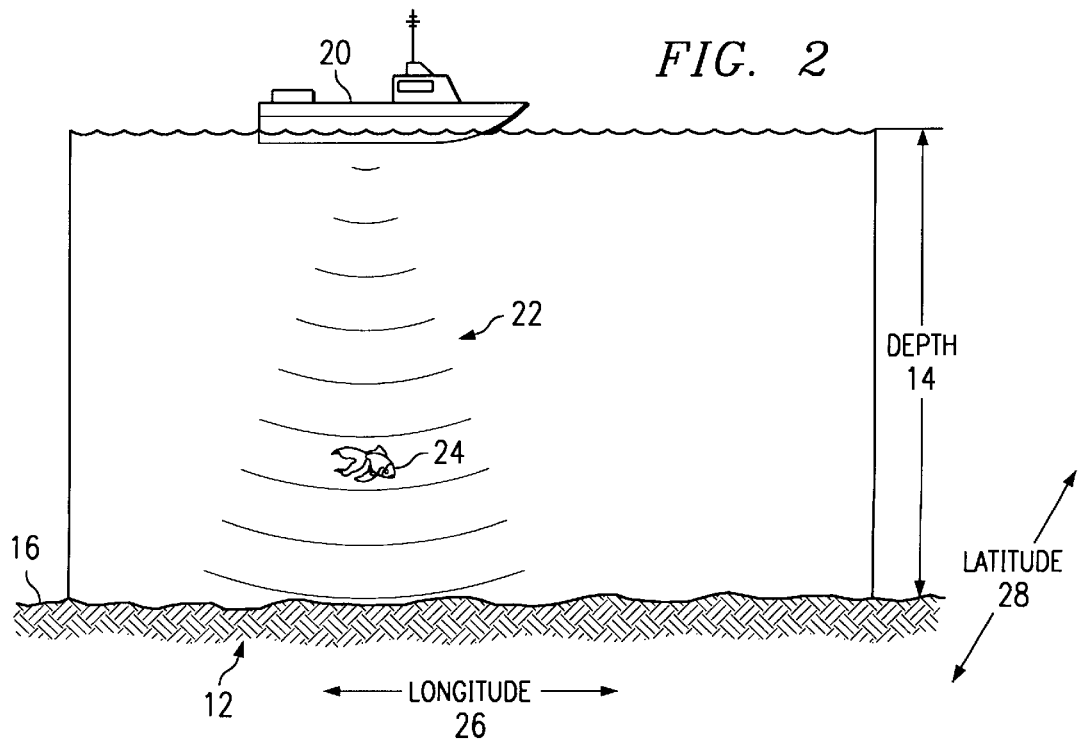

METHOD AND SYSTEM FOR ENHANCING THE ACCURACY OF MEASUREMENTS OF A PHYSICAL QUANTITY

TECHNICAL FIELD OF THE INVENTION

This invention relates generally to enhancing the accuracy of measurements of a physical quantity and more particularly to a method and system for enhancing the accuracy of measurements of a physical quantity.

BACKGROUND OF THE INVENTION

Modeling of a physical object often requires the taking of measurements. The measurement taking process on occasion introduces an error associated with each measured value. If the measurement taking process is conducted in an appropriate fashion, the errors should be normally distributed about a mean of zero. However, at times, the measurement taking or measurement recordation process is flawed, resulting in flawed or anomalous data. In such a case the use of such data to represent the measured object would be incorrect and would provide imprecise results. Therefore, it is desirable to determine whether a measurement is anomalous before using the measurement to represent a physical quantity.

Although anomaly detection has utility in numerous applications and for numerous types of measurements, one example of the usefulness of anomaly detection will be described with reference to bathymetric data. Oceanographers and ocean explorers make use of charts of the ocean floors. Such charts are produced by taking depth measurements of the ocean floor. One example of a procedure for taking a depth measurement of the ocean floor involves projecting, from an ocean vessel, sound waves to the bottom of the ocean floor and measuring the time required for a reflected wave to return to the vessel. Such a procedure is subject to a variety of sources of error that create anomalous measurements. For example, a large ocean animal, such as a whale, may reflect a portion of the sound wave back to the vessel, creating an anomalous reading. In addition, measurements may be improperly recorded in meters where feet is the appropriate unit of measure, or feet where meters are the appropriate unit of measure. Such sources of errors lead to anomalous measurements that should be discarded prior to utilizing the data to represent a physical quantity.

SUMMARY OF THE INVENTION

Accordingly, a need has arisen for an improved method and system for enhancing the accuracy of measurements of a physical quantity. The present invention provides a system and method for enhancing the accuracy of measurements representing a physical quantity.

According to one embodiment of the invention, a method for enhancing the accuracy of measurements representing a physical quantity includes determining a trend for a plurality of measurements. For each of at least one of the plurality of measurements an associated residual between the trend and the measurement is determined, and, for at least one of the associated residuals, there is determined an interpolated value for the residual. The method also includes comparing, for each of the at least one associated residuals, the residual to the interpolated value of the residual to determine whether a measurement associated with the residual is anomalous. In response to determining that a measurement associated with the residual is anomalous, the anomalous measurement is discarded. The remaining non-anomalous measurements then represent the physical quantity.

According to another embodiment of the invention, a system for enhancing the accuracy of measurements of a physical quantity includes a storage medium, a processor coupled to the storage medium, and a computer program stored in the storage medium. The processor executes the computer program to determine a trend for a plurality of measurements. The processor executing the computer program generates a determination, for each of at least one of the plurality of measurements, an associated residual between the trend and the measurement, and also determines, for each of at least one of the associated residuals, an interpolated value for the residual. The processor running the computer program also compares, for each of the at least one associated residuals, the interpolated value to the residual to determine whether a measurement associated with the residual is anomalous. In response to determining whether a measurement is anomalous, execution of the computer program generates an indication that the measurement is anomalous so that it may be discarded. The non-anomalous measurements are then output from the system.

Embodiments of the invention provide numerous technical advantages. For example, in one embodiment of the invention, a method for enhancing the accuracy of measurements allows determination of whether a measurement is anomalous and whether it may be discarded. Discarding anomalous measurements creates a more accurate representation of the measured object than if the anomalous measurements were included. In one embodiment of the invention a Kriging process is utilized to perform an interpolation used in determining if a measurement is anomalous. The use of the Kriging process is particularly advantageous because Kriging automatically provides an error for an interpolated value, which is utilized in the present invention and which is not readily available with other interpolation methods without additional processing.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 1 is an isometric drawing illustrating a representation of the floor of an ocean;

FIG. 2 is a schematic drawing illustrating the measurement of the depth of a portion of the ocean floor;

DETAILED DESCRIPTION OF THE INVENTION

Figure 3:
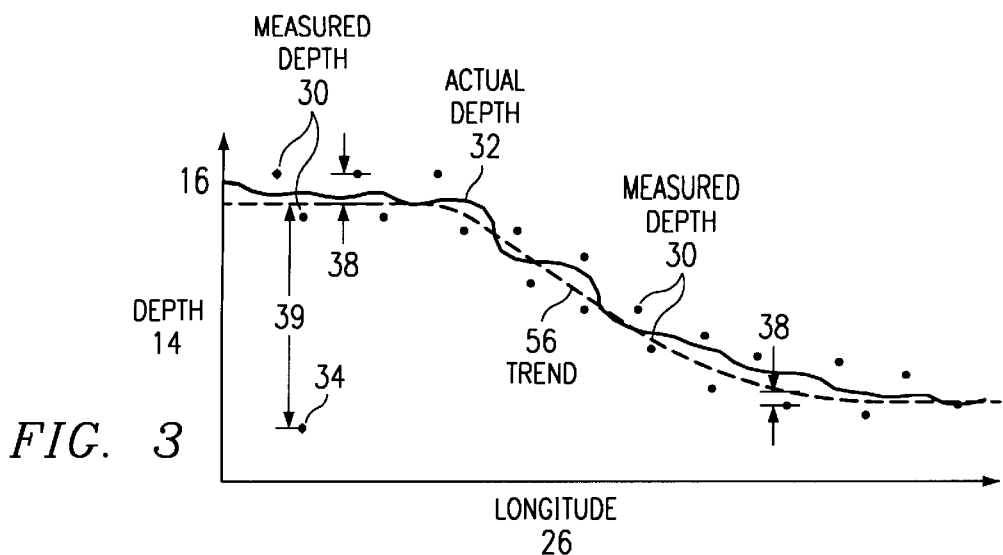
FIG. 3 is a graph illustrating the plurality of measured values of the depth of the ocean floor at different longitudes as well as the actual depth of the ocean floor at those longitudes.

The present invention and advantages thereof are best understood by referring to FIGS. 1 through 6 of the drawings, like numerals being used for like and corresponding parts of the various drawings.

Although the invention is useful to determine anomalies in measurements in a variety of contexts, an example application for the invention is the determination of whether depth measurements of the ocean floor are anomalous. Depth measurements of the ocean floors are often referred to as bathymetric data. The following description of the invention is in the context of determining anomalies in depth measurements of the oceans; however, the invention also finds utility with any suitable type of measurements including, but not limited to, measurement of temperature, pressure, volume, weight, mass, length, area, velocity, acceleration, luminosity, energy, power, electrical charge, and magnetism.

FIG. 1 is an isometric drawing illustrating a representation 10 of an ocean floor 16. Representation 10 provides a model of ocean floor 16, which is similar to models used by oceanographers or other persons interested in the shape and depth of ocean floor 16. The depth of ocean floor 16 is illustrated at a variety of locations 12 of ocean floor 16. Locations 12 are specified by a longitude 26 and a latitude 28. Such a model is developed through measurements of the ocean floor taken according to one method as described in conjunction with FIG. 2. According to the invention, such measurements are analyzed in order to exclude anomalous measurements for use in generating representation 10. Exclusion of anomalous measurements generates a more accurate representation of a physical quantity.

FIG. 2 is a schematic drawing illustrating the measurement of a depth 14 of ocean floor 16 at a location 12. As illustrated, a vessel 20 takes depth measurements by transmitting sound waves 22 to the ocean floor 16. By measuring the time for sound waves 22 to reflect back to vessel 20, an indication of depth 14 of ocean floor 16 is obtained. A location 12 at which depth 14 is measured is specified by longitude 26 and latitude 28. These depth measurements are subject to errors in the measurement taking process and should be examined for anomalous measurements to produce the best possible representation 10 of the ocean floor 16. For example, a large ocean animal 24, such as a whale, may alter the reflection time of sound waves 22 to return to vessel 20 and therefore produce a measurement that is not accurately indicative of depth 14. Such a measurement would be anomalous. Another example of the production of an anomalous measurement is the recordation of depth 14 in feet if the appropriate unit of measure is meters.

FIG. 3 is a graph illustrating a plurality of measured values 30 of depth 14 of ocean floor 16 at different longitudes 26 as well as the actual depth 32 of the ocean floor at those longitudes 26. A dotted line 56 represents a calculated trend of measured depths 30. Calculation of trend line 56 of measured depth 30 is described in greater detail in conjunction with FIGS. 5A through 5C. Although in the example illustrated in FIG. 2 measured depths 30 are taken at a given longitude 26 and latitude 28, for simplicity of description FIG. 3 illustrates varying depths as a function of longitude 26 for a constant latitude 28. As illustrated, most measured depths 30 lie close to trend line and are located on either side of the trend line. Also illustrated in FIG. 3 is one of a plurality of residuals 38. Each residual 38 indicates a difference between a measured depth 30 and trend line 56.

An outlier measurement 34 is illustrated as lying significantly below the trend line and has an associated outlier residual 39. An outlier measurement is a measurement that differs significantly from a trend of the measured values, such as trend line 56. An outlier measurement may be anomalous or non-anomalous. An anomalous outlier measurement is an outlier measurement that is determined not to be representative of the actual physical quantity. A non-anomalous outlier measurement is an outlier measurement that, although differing from a determined trend of measured values, is nevertheless determined to be representative of the actual quantity measured. Determination that a measurement is an outlier measurement 34 is performed according to the teachings of the invention as described with reference to FIGS. 5A through 5C.

Figure 4:
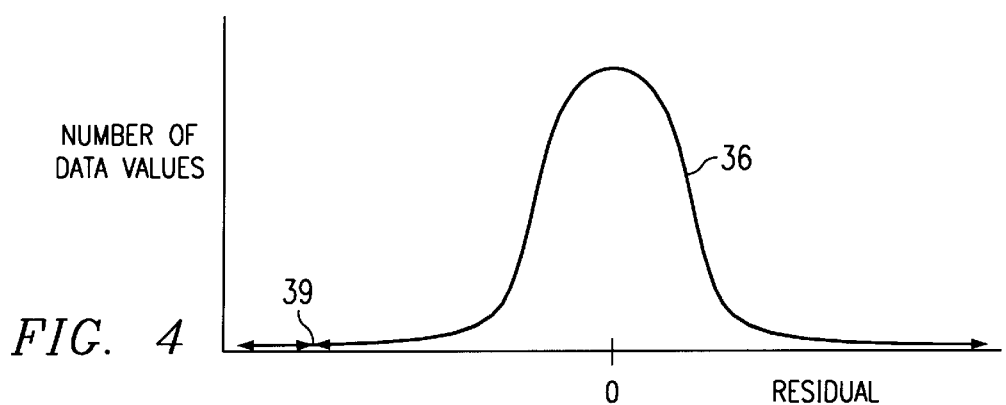
FIG. 4 is a graph illustrating a normal distribution of residuals centered about a mean of zero.

In FIG. 4 there is shown a graph illustrating a normal distribution of residuals 38 centered about a mean of zero. As illustrated, a normal bell-shaped distribution curve 36 represents an expected distribution of errors for measurements taken, for example, according to the method illustrated in FIG. 2. A normal bell-shaped distribution curve 36 is centered about a mean of zero, thereby indicating that the number of data values 30 exceeding trend line is approximately equal to the number of measured values 30 less than trend 56. Outlier residual 39 is illustrated on the far left hand side of the distribution curve 36. Such a residual value may lie on the far end of the curve because it is anomalous, and indicate that the measurement was improperly taken. Alternatively, the residual 39 may be at the far end of the curve because it is consistent with the normal distribution curve 36, but nevertheless is an extreme residual value.

If outlier residual 39 occurred because of an anomalous measurement, it would be desirable to discard outlier measurement 34 associated with outlier residual 39 to avoid using an anomalous measurement in producing representation 10 of ocean floor 16. If, however, outlier residual 39 was obtained correctly and merely corresponds to an extreme value on normal distribution curve 36, outlier measurement 34 should be retained in producing representation 10 of ocean floor 16. Determination of whether outlier measurement 34 is anomalous is made in accordance with the present invention as described with reference to FIGURES 5A through 5C.

Figure 5C:
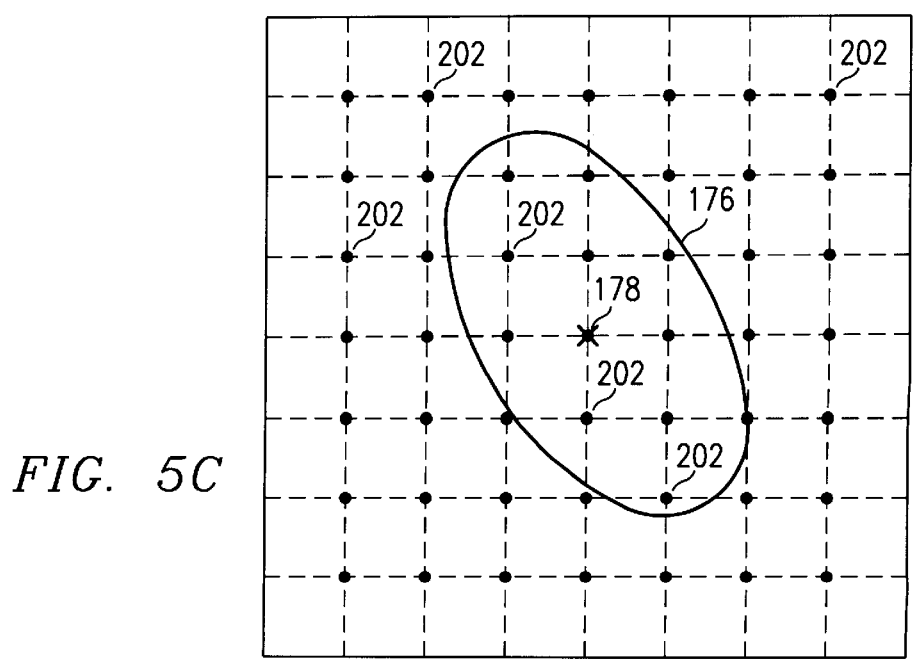
FIG. 5C is a plot of a variogram used according to the method of FIG. 5A in determining whether a measurement is anomalous.
Figure 5A:
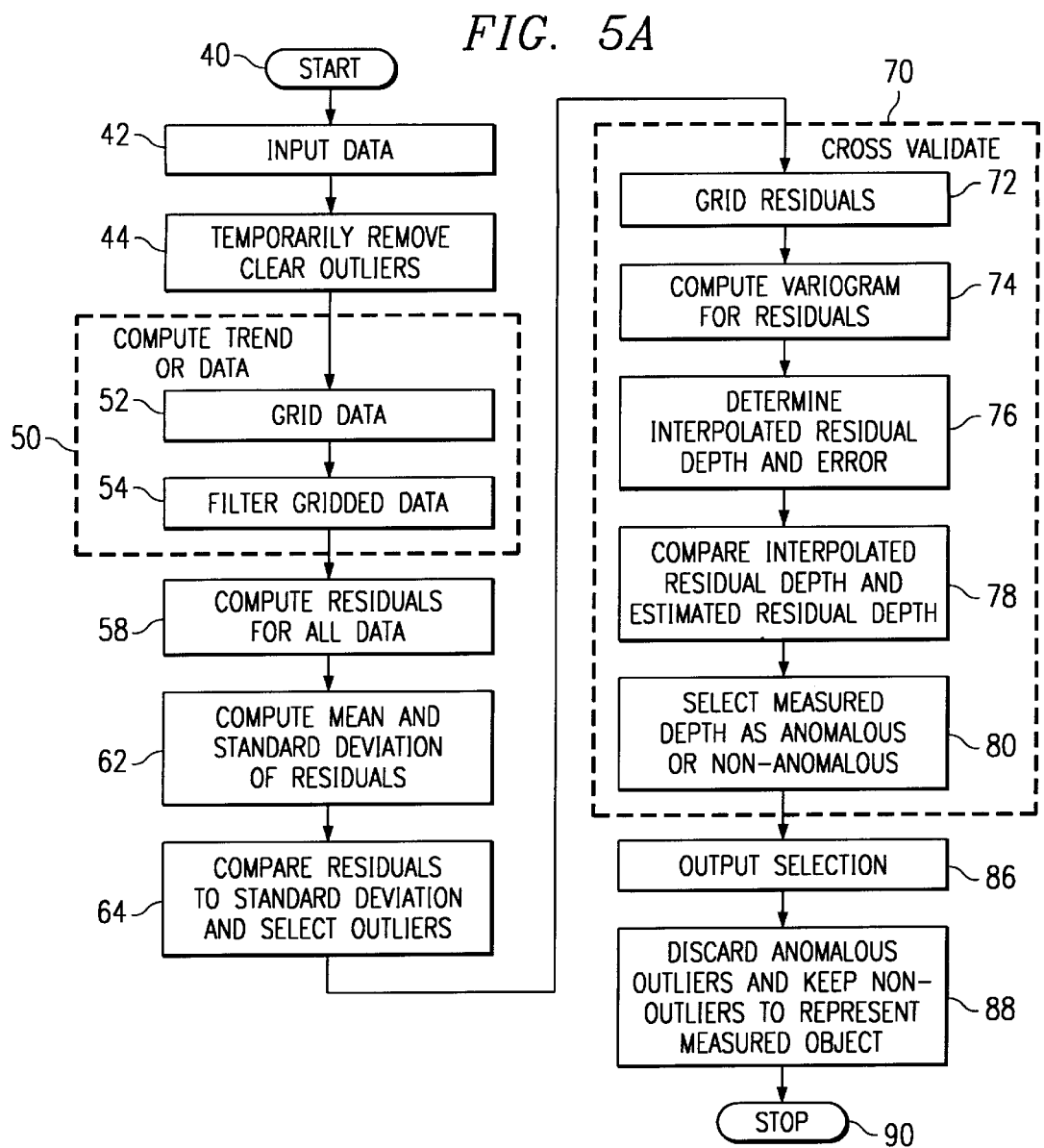
FIG. 5A is a flowchart illustrating a method for determining whether a measured value is anomalous.
Figure 5B:
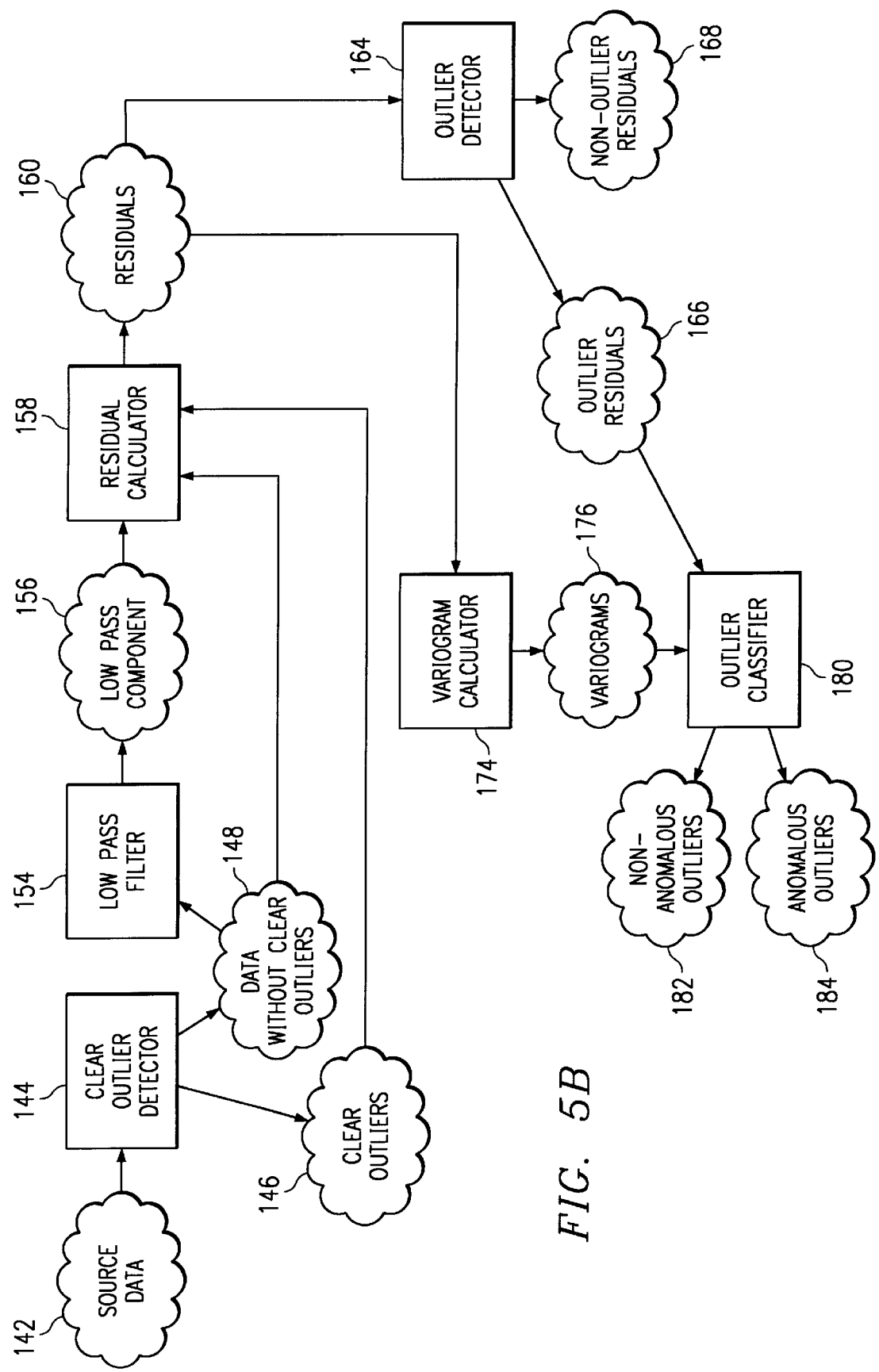
FIG. 5B is a graphical illustration of the method illustrated in FIG. 5A for determining whether a measured value is anomalous.

FIG. 5A is a flowchart illustrating a method for determining whether a measured value is anomalous, and FIG. 5B is a graphical illustration of the method of FIG. 5A for determining whether a measured value is anomalous. A method for determining whether an outlier is an anomalous measurement, such as outlier measurement 34, is described in conjunction with FIGS. 5A and 5B. For simplicity of description, the method is described in the context of bathymetric data obtained as illustrated in FIG. 2; however, as described above, the method may be used for a variety of types of measurements for various physical quantities.

The method begins at step 40 illustrated in FIG. 5A. At a step 42 a source data set 142 illustrated in FIG. 5B, is received. Source data set 142 includes a plurality of measured values 30 of depth 14 at associated longitudes 26 and latitudes 28. At a step 44 clear outliers, such as outlier measurement 34, are temporarily removed from the processed data to produce a clear outlier as data set 146 and a data set 148 that does not include clear outliers as illustrated in FIG. 5B.

A clear outlier is illustrated in FIG. 5B as producing clear outlier data set 146 and the data set 148 to facilitate description of the present invention; however, such illustration does not imply that a separate device or program is necessarily utilized for performing step 44. Additional representations in FIG. 5B, such as, a residual calculator 158, an outlier detector 164, a variogram calculator 174, and an outlier classifier 180 are similarly illustrated to facilitate description, and their functions are similarly not necessarily performed by independent devices or programs.

One example of a procedure for temporarily removing clear outliers is described below. A standard moving window technique in which measured values 30 are binned at, for example, 20 times the measured Real World Nyquist of data measurements is used. Binning refers to the generation of a regular array of map cells overlying the source data set and is used to compute statistics of data points lying in a small geographical area. A Real World Nyquist is the frequency beyond which no further information may be gleaned from the data. A mean and a standard variation for measured values 30 is calculated for each bin. Measured values 30 that exceed a predetermined multiple of the standard deviation of measured values 30 are temporarily removed as clear outliers. It has been determined that temporarily excluding errors that exceed five times the standard deviation is particularly advantageous; however, other suitable multiples of the standard deviation may be utilized to remove clear outliers. Step 44 of temporarily removing clear outliers is performed to avoid undue influence on a subsequent step 50 for computing a trend of measured values 30.

After clear outliers have been temporarily removed, the trend of data set 148 is determined at step 50. A preliminary step in computing the trend of data set 148 is to grid data set 148 at step 52. Gridding data set 148 produces a grid of data points that have values representing the depths at each grid point. These values at each grid point are based upon data within data set 148. An example technique for gridding data set 148 is the use of the Triangular Irregular Network algorithm. The Triangular Irregular Network algorithm is described in Macedonio, G. and Pareschi, M. T., 1991, *An Algorithm for the Triangulation of Arbitrarily Distributed Points: Applications to Volume Estimate and Terrain Fitting, Computers and Geosciences*, v. 17, no. 17, p. 859–874.

After data set 148 has been gridded, the gridded data is filtered at step 54 to maintain only the low frequency components of the gridded data. The low frequency components of the gridded data represent the trend of the gridded data. Step 54 of filtering the gridded data is illustrated in FIG. 5B as being performed by a low pass filter function 154. In one embodiment of the invention, the filtering at step 54 utilizes a simple Gaussian expression with a half-width given by:

$10 * \Sigma_d;$ where $\Sigma_d$ is the horizontal resolution of the input data computed by a spectral analysis. This corresponds to maintaining wavelengths of the data greater than 10 times the Real World Nyquist of the data.

Step 54 of filtering the gridded data produces a low pass component or trend 156 illustrated in FIG. 5B. Low pass component or trend 156 represents the trend of data set 148. An example illustration of a low pass component is provided in one dimension for a constant latitude as trend 56 in FIG. 3. Based on the computed low pass component or trend 156 of data set 148, the difference between trend 156 and each data point of source data set 142 is calculated at step 58. This difference between each data point and the calculated trend is referred to as a residual. Step 58 of computing residuals is illustrated in FIG. 5B as being performed by a residual calculator 158. As shown, the residual calculator 158 receives data values from both clear outlier data set 146 and data set 148. Thus clear outliers in data set 146 are temporarily removed to predict trend 156 of source data 142, but are later used after trend 156 is determined.

As described above, the data set 148 is gridded before the low pass component or trend 156 is calculated, and as a result the low pass component or trend 156 must also be gridded. Therefore, some interpolation is necessary to determine a measurement at a random location on the gridded surface of low pass component or trend 156 to provide an associated residual. This may be accomplished according to a variety of techniques including simple bilinear interpolation. Residuals are calculated by subtracting the data values both in clear outlier data set 146 and data set 148, or in other words the data values from source data set 142, from the gridded low pass component or trend 156. A set of residuals 160 illustrated in FIG. 5B is produced by step 58 that computes residuals for all data within source data set 142.

After generating residuals 160 at step 58, the mean and standard deviation of each residual of the set of residuals 160 is calculated at a step 62. At a step 64 each of the residuals are compared to the standard deviation calculated at step 62. If a residual exceeds a particular multiple of the standard deviation of residuals, the residual is identified as an outlier, and the residual may be anomalous or non-anomalous. If a residual is less than a particular multiple of the standard deviation of the residuals, the residual is identified as a non-outlier. In one embodiment of the invention, a multiple of 2.5 has been determined to provide particularly advantageous results. Steps 62 and 64 of computing the mean and standard deviation for each of the residuals 160, comparing residuals to the standard deviation of residuals 160, and selecting outliers is illustrated in FIG. 5B as performed by an outlier detector 164. The results of these steps produce a set of outlier residuals 166 and a set of non-outlier residuals 168.

Non-outlier residuals 168 do not differ from the mean of all of the residuals 160 to an extent great enough to constitute anomalous data. Outlier, residuals 166 differ from the mean of residuals 160 to an extent great enough to be anomalous. Step 64 of comparing residuals 160 to the standard deviation of residuals 160 and selecting outliers is performed to increase processing speed of anomalous data detection. Alternatively, step 64 is omitted and the determination of whether a residual is associated with an anomalous measurement is performed on each residual of the set of residuals 160 rather than only residuals 166 that constitute outliers. The remainder of the method illustrated in FIGS. 5A and 5B is directed to determining whether outlier residuals 166 are anomalous or non-anomalous.

One method for differentiating between residuals that are anomalous and residuals that are not anomalous is cross validation. Cross validation differentiates between residuals that are supported by neighboring depth measurements and those that are not. Residuals supported by their neighbors, despite being abnormally high, are much more likely to be valid data points than isolated outliers. Cross validation begins at step 70. A first step in cross validation occurs at a step 72 in which residuals 160 are gridded. Gridding residuals 160 is performed in the same manner as described above with reference to gridding data set 148. At a step 74, variograms are calculated for gridded residuals 160. Variograms are used to determine which neighboring measurements should be used in determining whether a residual is supported by its neighbors and facilitates interpolation of a data value based on neighboring data values. Variograms are described in greater detail in conjunction with FIG. 5C. Steps 70 and 72 of gridding residuals 160 and computing a variogram for residuals 160 are illustrated in FIG. 5B for simplicity of description as being performed by a variogram calculator 174. Variograms 176, illustrated in FIG. 5B, are produced by step 74.

Based on the computed variogram 176 for each outlier residual, an interpolated value is calculated at step 76 for each of the outlier residuals 166 based upon the value of neighboring residuals to determine whether an outlier residual is anomalous or non-anomalous. For this calculation, the value calculated for an outlier residual at step 58 is not included. Thus an outlier residual in the set of outlier residuals 166 is not included in the determination of an interpolated value for that outlier residual. In addition to determining an interpolated value for an outlier residual, an error associated with the interpolated value is determined. One example of step 76 of determining an interpolated residual value and error is described in greater detail in conjunction with FIG. 5C.

At a step 78, the interpolated value for an outlier residual is compared to the measured value of the same outlier residual to determine if they are statistically inconsistent. If the measured value of an outlier residual differs from the interpolated value of an outlier to too great a degree an outlier residual is classified as anomalous. If however, an outlier residual in the set of outlier residuals 166 differs from the interpolated value of an outlier residual by less than an acceptable amount, the outlier residual is classified as non-anomalous. In one embodiment, the determination of whether the interpolated value for an outlier residual differs from the measured value of an outlier residual is made according to the formula $$|D-I| > \sqrt{\delta I^2 + \delta D^2}$$

where
 I=interpolated value for a residual
 D=measured value for a residual
 $\delta I$=calculated error for I
 $\delta D$=calculated error for D.

The calculated error for the measured value of residuals ($\delta D$) is determined based on the error in the measurement of the associated depth. If the left-hand-side of the above equation exceeds the right-hand-side, the associated residual is classified as anomalous. This classification is performed at step 80. Steps 76, 78, and 80 are illustrated in FIG. 5B, to facilitate description, as being performed by an outlier classifier 180. The results of step 80 are a data set 182 of non-anomalous outliers and a data set 184 of anomalous outliers. Data sets 182 and 184 are generated at a step 86. At a step 88 data in source data set 142 associated with residuals in anomalous outlier data set 184 are discarded. In addition, data in source data set 142 associated with residuals in non-anomalous data set 182 are combined with data in source data set 142 associated with residuals in non-outlier data set 168 for use in modeling the measured object. The method concludes at step 90.

FIG. 5C is a plot of the variogram 176 used according to the method of FIG. 5A in determining whether a measurement is anomalous. Variogram 176 identifies the extent an outlier residual 178 is correlated with data values proximate the outlier residual 178. Neighboring data values are correlated with outlier residual 178 if they lie within the range of the variogram centered at the residual under consideration. Therefore, only data values within variogram 176 are utilized to calculate an interpolated value for outlier residual 178. The interpolation process determines an interpolated value for outlier residual 178 based on the residual values of neighbor residuals 202 within variogram 176 using a weighted average. The weighting is based, in part, on the extent to which data values within variogram 176 are correlated with outlier residual 178. This correlation varies roughly with the distance between a neighboring residual 202 and outlier residual 178. In addition, the weighting is dependent upon the uncertainty of the residual values of neighboring residuals 202 within variogram 176.

An exemplary process of implementing such interpolation and calculation of a variogram is referred to in the art as multi-variate Kriging and is described in *Introduction to Disjunctive Kriging and Nonlinear Geostatistics*, by J. Rivoirand, 1994, Clarendon Press, Oxford University Press, which is incorporated by reference herein. Although an interpolated value for outlier residual 178 and an associated error may be obtained according to other interpolation methods, the use of Kriging is particularly advantageous.

In the described example of selecting whether an outlier residual is anomalous or non-anomalous, the measured values of depth 14 were obtained on ocean surface 16 for various longitudes 26 and latitudes 28. Thus, interpolation utilized neighbors lying roughly in a surface specified by two dimensions. However, other applications for the invention utilize interpolation in a single dimension and in more than two dimensions.

Thus, the method described in conjunction with FIGS. 5A through 5C determines whether a measurement is anomalous or non-anomalous and allows discarding of anomalous measurements in order to provide a more accurate representation of the measured object. In one embodiment of the invention, Kriging is used to perform an interpolation and error calculation. Kriging is particularly useful for these functions because Kriging automatically provides an error with the interpolated value, alleviating the need to perform additional calculations that would be required if an interpolation method was used that did not automatically provide an error calculation. An example of that utilizes the above method is described below in conjunction with FIG. 6.

Figure 6:
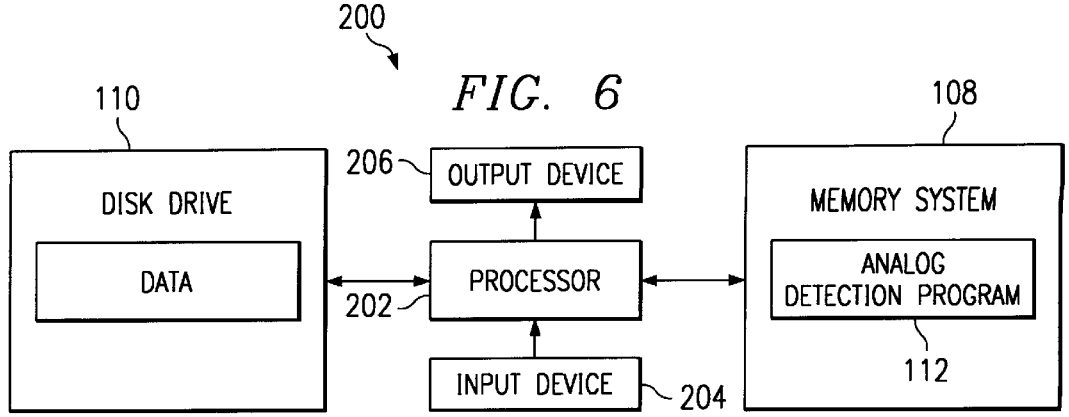
FIG. 6 is a block diagram of an anomalous measurement detection system.

FIG. 6 is a block diagram of anomalous measurement detection system 100 for determining whether a measured value is anomalous. Anomalous measurement detection system 100 includes a processor 202, an input device 202, an output device 206, a memory system 108, and a disk drive 110. The present embodiment includes computer software stored in memory system 108 or on disk drive 110 and is executed by processor 202. Disk drive 110 includes a variety of types of storage media such as, for example, floppy disk drives, hard drives, CD ROM disk drives, or magnetic tape drives. Data is received from a user of anomalous measurement detection system 100 using a keyboard or other type of input device 204. Data is provided to a user of anomalous data detection system 100 through output device 206, which may include a display, printer, or any other suitable type of output device.

Anomalous measurement detection system 100 includes an anomaly detection program 112. In FIG. 6, the anomaly detection program 112 is illustrated as stored in memory system 108, and will be executed by processor 202. Anomaly detection program 112 is alternatively stored on disk drive 110. The processor 202 when executing the anomaly detection program 112 receives source data set 142 and determines which data values within the source data set 142 are anomalous and which are non-anomalous according to the method described in conjunction with FIGS. 5A through 5C. The system provides an outlier representing the data values that are anomalous and the data values that are non-anomalous. The anomalous measurement data detection system 100 discards anomalous data to enhance the accuracy of measurements representing a physical quantity.

Although the present invention and its advantages have been described in detail, it should be understood the various changes, substitutions, and alterations can be made therein without departing from the spirit and scope of the present invention as defined by the appended claims.

What is claimed is:

1. A method for enhancing the accuracy processing measurements of a physical quantity comprising the steps of:
   determining a trend for a plurality of measurements;
   determining, for each of at least one of the plurality of measurements, an associated residual between the trend and the measurement;
   determining, for each of at least one of the associated residuals, an interpolated value for the residual;
   comparing, for each of the at least one associated residuals, the associated residual to the interpolated value of the residual to identify an anomalous associated measurement;
   in response to identification of an anomalous measurement, discarding the anomalous measurement; and
   generating an output of all measurements of the physical quantity not discarded as anomalous.

2. The method of claim 1, wherein the step of determining, for each of the at least one associated residuals, an interpolated value for the residual and an error value associated with the interpolated value comprises the process of Kriging.

3. The method of claim 1, wherein the step of comparing, for each of the at least one associated residuals, the associated residual to the interpolated value of the residual comprises determining whether the magnitude of the difference between the associated residual and the interpolated value of the residual exceeds a first value.

4. The method of claim 1, and further comprising the steps of:
   determining, for each of the at least one of the plurality of measurements, a residual error associated with the residual;
   determining, for each of the at lest one of the associated residuals, an interpolated value error associated with the interpolated value; and
   wherein the step of comparing, for each of the at least one associated residuals, the associated residual to the interpolated value of the residual comprises determining whether the magnitude of the difference between the associated residual and the interpolated value of the residual exceeds $\sqrt{\delta I^2 + \delta D^2}$, where "$\delta I$" is the interpolated value error and "$\delta D$" is the residual error.

5. The method of claim 1, wherein the step of determining a trend for a plurality of measurement further comprising associating each of the plurality of measurements with points on a grid.

6. The method of claim 2, wherein the step of determining an interpolated value and an error value by Kriging comprise determining an interpolated value and an error value by multi-variate Kriging.

7. A method for enhancing the accuracy of depth measurements of a portion of an ocean floor comprising the steps of:
   determining a trend for a plurality of depth measurements;
   determining, for each of the plurality of depth measurements, an associated residual between the trend and the measurement;
   determining when the magnitude of the residual exceeds a particular value;
   determining, for each of the residuals that exceeds the particular value, an interpolated value for the residual;
   comparing, for each of the residuals that exceeds the particular value, the residual to the interpolated value of the residual to identify an anomalous associated depth measurement;
   in response to identification of an anomalous associated depth measurement, discarding the anomalous depth measurement; and
   generating an output of all depth measurement of the physical quantity not discarded as anomalous.

8. The method of claim 7, wherein the step of determining, for each of the residuals that exceeds the particular value, an interpolated value for the residual and an error value associated with the interpolated value comprises the process of Kriging.

9. The method of claim 8, wherein the steps of determining, for each of the residuals that exceeds the particular value, an interpolated value for the residual comprises the process of multi-variate Kriging.

10. The method of claim 7, wherein the step of comparing, for each of the residuals that exceeds the particular value, the residual to the interpolated value of the residual includes the step of determining whether the difference between the associated residual and the interpolated value of the residual exceeds a first value.

11. The method of claim 10, and further comprising steps of:
    determining for each of the residuals that exceeds a particular value, an error value associated with the determined interpolated value for the residual;
    determining, for each of the plurality of depth measurements, a residual error associated with the residual; and
    wherein the step of comparing, for each of the residuals that exceeds the particular value, the residual to the interpolated value of the residual includes the step of determining whether the difference between the residual and the interpolated value of the residual exceeds $\sqrt{\delta I^2 + \delta D^2}$, where "$\delta I$" is the interpolated value error and "$\delta D$" is the residual error.

12. The method of claim 7, wherein determining, for each of the plurality of depth measurements, whether the magnitude of the residual exceeds a particular value includes the step of determining whether the magnitude of the residual exceeds 2.5 times a standard deviation of all residuals of all plurality of measurements.

13. A system for outputting anomalous measurements of an object of interest, comprising:
    a storage medium;
    a processor coupled to the storage medium;
    a computer program stored in the storage medium, the computer program executed on the processor to:
    determine a trend for a plurality of measurements;
    determine, for each of at least one of the plurality of measurements, an associated residual between the trend and the measurement;
    determine, for each of at least one of the associated residuals, an interpolated value for the residual;
    compare, for each of the at least one associated residuals, the error value to the residual to determine whether a measurement associated with the residual is anomalous;
    in response to an identification of an anomalous measurement, discarding anomalous measurements; and output means for generating all measurements of the object of interest not discarded as anomalous.

14. The system of claim 13, wherein the computer program when executed on the processor determines an interpolated value for the residual by the process of Kriging.

15. The system of claim 13, wherein the computer program when executed on the processor program determines, for each of the at least one associated residuals, whether the magnitude of the difference between the residual and the interpolated value of the residual exceeds a first value.

16. The system of claim 13, wherein the computer program when operated on the processor:

determining, for each of the at least one of the plurality of measurements, a residual error associated with a residual;

determining for each of the at least one of the associated residuals an interpolated value error associated with the interpolated value; and determines, for each of the at least one associated residuals, whether the magnitude of the difference between the residual and the interpolated value of the residual exceeds $\sqrt{\delta I^2 + \delta D^2}$, where "$\delta I$" is the interpolated value error and "$\delta D$" is the residual error.

* * * * *